July 10, 1928.
H. KATTWINKEL
1,676,333
RESILIENT INTERMEDIATE MEMBER FOR JOINTED COUPLINGS AND THE LIKE
Filed Nov. 3, 1924
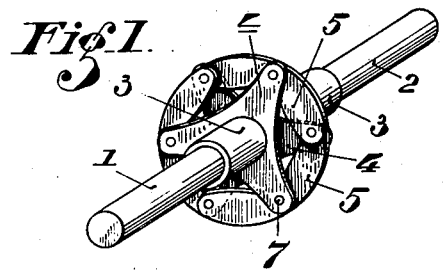
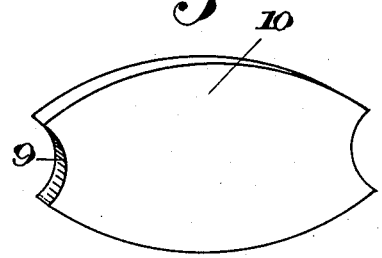
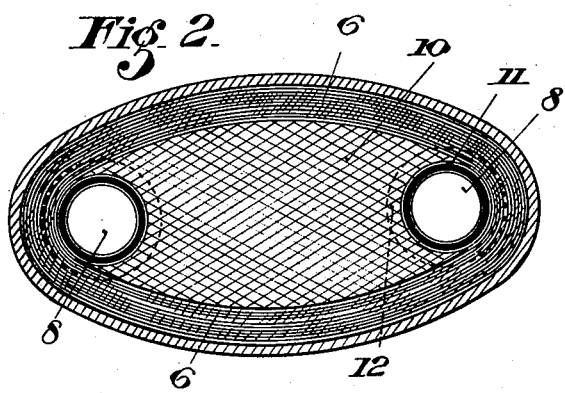
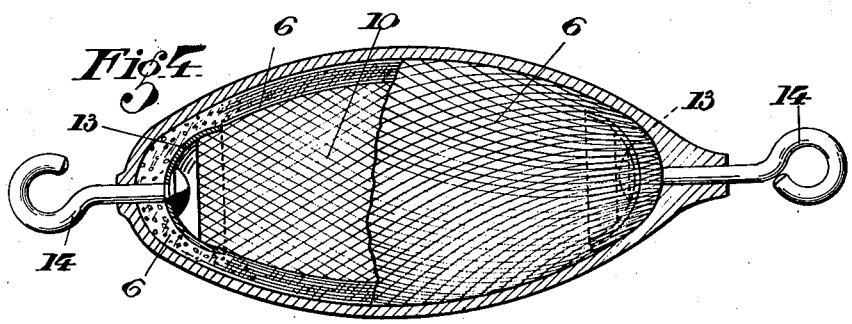
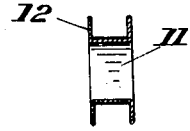
Inventor:
H. Kattwinkel
By Marks & Clerk
Attys.

Patented July 10, 1928.

1,676,333

UNITED STATES PATENT OFFICE.

HANS KATTWINKEL, OF COSWIG, GERMANY.

RESILIENT INTERMEDIATE MEMBER FOR JOINTED COUPLINGS AND THE LIKE.

Application filed November 3, 1924, Serial No. 747,680, and in Germany November 3, 1923.

My invention relates to improvements in power transmitting means, and more particularly in power transmitting elements designed for use in shaft couplings for automobiles and other vehicles.

In automobiles, so-called Cardan joints are employed for the transmission of power from the drive to the rear axle, in view of the complicated oscillations, partly vertical and partly lateral, of the rear axle. Such joints, which usually consist of forked members connected together by pivots, are practically not able to follow all the movements of the axle. Furthermore they need careful lubrication, which however proves very difficult on account of the centrifugal forces arising, as it is not easy to keep the lubricant on the places needing lubrication. The use, instead of rigid joints, of resilient rubber discs with fabric insertions, which has now been finding favour for some time, therefore represents a substantial advance, particularly as in this case no sort of lubrication or other attention is required. Although this kind of power transmission is very advantageous in itself, it nevertheless suffers from the great disadvantage that by the boring of the holes for the bolts or the like that transmit the forces the fabric that constitutes the real power-transmitter is rendered discontinuous and reduced in strength. The individual fibres of the fabric are furthermore only exceptionally stressed purely in tension in the most favourable direction, that is, longitudinally. For this reason, and in consequence of the special character of the construction of such rubber disks with fabric insertions—a plurality of fabric layers are always superposed—this disc prevents the power output from being ascertained by calculation, so in this connection one is entirely dependent upon experimental results.

According to the invention the fabric discs of such couplings are replaced by specially constructed intermediate or coupling members, which consist of flexible tension members (strings, bands, wires or the like) stressed almost exclusively in their longitudinal direction, and of a resilient pressure body more or less enclosed by them, the yieldingness of which permits of a lateral softening of the tension members, and consequently a change in their effective length in such a way that the tensile forces acting on the said intermediate or coupling member are taken up more or less resiliently.

Hence my improved compound body forming the intermediate or coupling member consists on the one hand of parts stressed purely in tension and on the other hand of parts stressed substantially in compression. That implies firstly an ideally favourable utilization of the material, and secondly a reduction in the dimensions and weight of the jointed couplings in question. On the other hand the new construction of the intermediate members renders possible an exact calculation in advance.

In the drawing the invention is illustrated by way of example in two constructional forms, wherein Figure 1 shows in perspective a jointed coupling for automobile vehicles, equipped with the new intermediate members.

Figure 2 illustrates one of the intermediate members in section through its centre line.

Figure 3 shows a pressure body for intermediate members of the kind illustrated in Figure 2.

Figures 4 and 5 illustrate another constructional form of the intermediate member and of the pressure body belonging thereto, while:

Figure 6 illustrates a detail.

Referring now to the coupling illustrated by way of example in Fig. 1, upon the shaft ends 1, 2, facing one another, are mounted the transversely armed spiders 3, which, in the case forming the basis of the drawing, are each equipped with three arms 4, arranged in staggered relationship to one another. Each two adjacent arms belonging to different shafts are connected together through the medium of the intermediate or coupling members 5, this being done by means of bolts 7, which are carried through eyes 8 provided on the one hand in the intermediate members and on the other hand in the arms 4.

The construction of the intermediate or coupling members 5 is obvious from Figure 2. The basic shape is formed by means of a body 10 consisting of resilient material, preferably vulcanized rubber, of a substantially elliptical outline. On the two edges this body (Figure 3) is provided with arcuate notches 9. In these notches are placed bobbin-like sleeves 11 (Figure 6) which with their flange members 12 join on to the lateral surfaces of the rubber member 10. The bores of the sleeves 11 form the eyes for the reception of the connecting bolts 7. About the whole is wound, preferably in a plurality of turns and layers, a flexible resilient or rigid tensile organ 6, which may consist for example of a strong hemp string, of a strip of suitable material, or else of wire or the like. In general the use of strings is advisable on account of their being more yielding.

When winding on the tensile organ 6, especially if the latter consists of a fibrous material, it is preferably saturated with rubber, and, after the winding is completed and the ends secured, is coated with rubber solution. The connecting body thus formed may then also be vulcanized. In this case the sleeves 11, consisting of metal, are preferably also coated with rubber, so that all parts form a solid, coherent, externally smooth body, which is not easily affected by weather conditions. Under some circumstances it is even sufficient to impregnate with rubber or provide with a corresponding coating merely the string winding or the outer layer thereof. Instead of india rubber some other material such as veneer capable of resisting atmospheric influences and possessing the necessary flexibility may of course be employed.

While in the case of an intermediate member of the constructional form described the resilient pressure body 10 has a flat form, it is constructed, in the case of the intermediate member or coupling illustrated in Figure 4, as a solid of revolution, which is preferably in the form of an ellipsoid. In this case the body is wound with the tensile organ 6 not only on the edge as in the case of the constructional form according to Figure 2, but round the entire periphery, this being done in such a manner that the individual strands of the tensile organ run as nearly as possible in meridian lines, in order that the tensile forces may be taken up as favourably as possible by the individual strands. In practice the tensile organ is applied in the manner which may be seen from Figure 4 somewhat in the nature of a roll such as is formed when winding strings on to a stick. Before winding, the pressure body 10, the shape of which is shown by Figure 5, is provided at both ends with hollow hemispherical caps 13, 13, with which are connected the draw hooks or eyes 14, 14, which serve for joining the intermediate member to the power-transmitting system in question. The winding strands are then passed at the ends of the pressure body over caps 13, 13. The spindle-shaped body thus formed may be impregnated, as described above, during or after its production, with rubber or the like and vulcanized.

Apart from the advantages already indicated, the intermediate or coupling member described, offers the further advantage that while requiring the smallest amount of space it is in a condition to take up resiliently quite extraordinarily high tensile forces, and is also capable of yielding transversely to the direction of the main stress, which makes the invention specially suitable for employment as an intermediate member in jointed couplings for automobile vehicles.

While in describing the invention reference has been made to particular examples I wish it to be understood that I do not limit myself to the constructions shown in the drawing, nor to the use of the element in a coupling for automobiles.

I claim:

1. A resilient tensile force transmitting member, more particularly for the universal joints in automobiles and the like, comprising a body capable of yielding resiliently to pressure, the said body having a bulging outline at least on two opposite sides, a tensile member enclosing said body at least on two bulged sides and means in bearing contact with said tensile member for attaching external connecting means to said tensile member.

2. A resilient tensile force transmitting member, more particularly for the universal joints in automobiles and the like, comprising a body capable of yielding resiliently to pressure, the said body having a bulging outline at least on two opposite sides, a flexible tensile member wound round the bulging parts of said body and means for attaching external connecting means to said tensile member.

3. A resilient tensile force transmitting member, more particularly for the universal joints in automobiles and the like, comprising a body capable of yielding resiliently to pressure, the said body having a bulging outline at least on two opposite sides, a cord of fibrous materials wound round the bulging parts of said body in a plurality of turns and means for attaching external connecting means to said tensile member.

4. A resilient tensile force transmitting member, more particularly for the universal joints in automobiles and the like, comprising a body capable of yielding resiliently to pressure, the said body being of bulging and substantially elliptical form, a winding of a flexible tensile member bearing against the longitudinal edges of said elliptical body and means for attaching external connecting means to said tensile member, 5. A resilient tensile force transmitting member, more particularly for the universal joints in automobiles and the like, comprising a body of bulging form capable of yielding to pressure, a flexible tensile member enclosing said body at least on two sides and rings embedded between said body and said tensile member, said rings being in bearing contact with said tensile member.

6. An elastic power transmitting member, comprising a body yielding as against pressure, a flexible tension member embracing said body, and rings embedded between said body and tension member.

7. An elastic power transmitting member, comprising a body of substantially elliptical form elastically yielding as against lateral pressure, a tension member of fibre material embracing said body at two sides, said body being formed at opposite ends with cut-out portions, and rings embedded between said cut-out portions and the adjacent parts of said tension member.

8. A resilient tensile force transmitting member, more particularly for the universal joints in automobiles and the like, comprising a plate of india rubber of substantially elliptical form having hollows on the two edges, a winding of flexible tensile members enclosing said body and bearing close against its convex edges, and rings embedded in said hollows and partly surrounded by said winding.

9. A universal joint comprising a pair of spiders facing one another, connecting means on said spiders, a tensile force transmitter connecting said spiders with one another, said tensile force transmitter comprising a body of bulging form capable of yielding to pressure and a flexible tensile member surrounding said body and means in bearing contact with said tensile member for attaching the connecting means of said spiders to said tensile member.

In testimony whereof I affix my signature.

HANS KATTWINKEL.